Figure 1A:
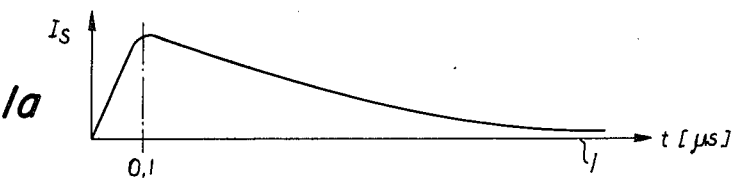

Aug. 10, 1965    F. FRÜNGEL    3,200,410
LIGHT CONTROL ARRANGEMENT
Filed Oct. 1, 1962

INVENTOR.
Frank Früngel
BY
Michael Striker
his Attorney

United States Patent Office 3,200,410
Patented Aug. 10, 1965

3,200,410
LIGHT CONTROL ARRANGEMENT
Frank Früngel, 400 Suelldorfer Landstr.,
Hamburg-Rissen, Germany
Filed Oct. 1, 1962, Ser. No. 227,609
Claims priority, application Germany, Oct. 2, 1961,
J 20,607
10 Claims. (Cl. 352—84)

The present invention concerns a light control arrangement, and more particularly an arrangement comprising a Kerr cell operable by the application of pulses of comparatively short duration and at arbitrarily determinable frequencies. Arrangements according to the invention are particularly useful for controlling the exposure time in photographic cameras, e.g. high speed cinematographic cameras.

Since a Kerr cell constitutes an important component of the arrangement according to the invention it may be stated that conventionally a Kerr cell comprises a transparent or translucent container filled e.g. with nitrobenzene so oriented that a beam of light can pass through this container in a predetermined direction, and a capacitor composed of plate elements spaced from each other in a direction transverse of the direction of the beam of light. When by energization of the capacitor an electric field is set up in direction transverse of the beam of light and if the latter consists of polarized light having a certain plane of polarization, this plane of polarization is turned in transverse direction up to 90°. If two polarizers having their polarization planes oriented at right angles to each other are arranged one ahead and one behind the Kerr cell the arrangement can be operated as an electrically controllable light valve which is open when the plane of polarization of the light polarized by the first polarizer is turned in the region between the plates of the capacitor 90°. Intermediate degrees of valve opening depend upon the voltage applied to the capacitor and the duration of the open condition of this light valve depends upon the duration of the energization of the capacitor e.g. upon the duration of an electric pulse applied thereto.

Conventionally light valves of the Kerr cell type are operated and controlled by high power control tubes e.g. by thyratrons. The energy required for opening a Kerr cell type light valve can be determined as indicated by the following example: assuming that the capacity of the Kerr cell amounts to 100 pf. and that a voltage of 40 kv. is required for causing the valve to open, then the energy to be applied amounts, according to the well known equation to $E = .5 C \cdot U^2$, $50 \cdot 10^{-12} \cdot 1.6 \cdot 10^9 = 8 \cdot 10^{-2} = .08$ wattsecond If now the Kerr cell is to be opened with $10^{-8}$ seconds then the above calculated amount of energy must be applied within this short period of time. Consequently a generator must be available which is capable of producing for a period of time of $10^{-8}$ seconds a power of $N = .08/10^{-8} = 8$ megawatts Power pulses of this magnitude cannot be furnished even by the otherwise best suited hydrogen filled thyratrons so that it is impossible with conventional Kerr cell control arrangements to obtain opening times of the order of magnitude mentioned above. However, it has been found that impulse transformers are very well capable of handling power pulses in the above-mentioned order of magnitude. It is well known that ordinary impulse transformers convert an introduced primary impulse into a secondary impulse of substantially the same shape. However, an ordinary impulse transformer cannot be used for energizing a Kerr cell for the above mentioned purposes because the massive iron core does not permit the pulse current to increase with the required extremely high steepness. On the other hand, it has been found that a special type of impulse transformer having a differentiating characteristic, i.e. furnishing output current pulses which constitute the first derivative of the applied primary current impulses, is very well suited for controlling the operation of a Kerr cell in a manner as set forth above.

It is, therefore, one of the objects of this invention to provide for a light control arrangement including Kerr cell means operated by an impulse transformer having a differentiating characteristic so as to obtain Kerr cell opening times of extremely brief duration.

It is a further object of this invention to provide for a control arrangement as set forth wherein light pulses of predetermined duration and frequency are passed through the Kerr cell under the control of the above-mentioned impulse transformer in such a manner that the light pulses passed through the Kerr cell have a pulse duration limited to a predetermined time period shorter than that of the original light pulses and shorter than the output current pulses of the impulse transformer.

It is still another object of the invention to provide for an arrangment as mentioned above including preferably variable delay means for producing substantially coincidence between the light pulses passed through the Kerr cell and the peaks of the original current pulses applied to the light source.

It is still another object of this invention to provide for an arrangement for producing cinematographic pictures with extremely brief exposure times, by combining a cinematographic camera operable at a predetermined picture frequency and comprising shutter means rendering the film consecutively accessible to incoming light through predetermined consecutive time periods, with electrically energizable light source means producing light pulses which are so controlled that these light pulses occur individually within said predetermined consecutive time periods and that the original pulse duration of said light pulses is reduced, before they reach the shutter means of the camera, to an effective pulse duration substantially shorter than that of said consecutive time periods of shutter action.

It is another object of the invention to provide for an arrangement as mentioned in the preceding paragraph in which the means controlling the light pulses as mentioned above comprise a Kerr cell.

With above objects in view the invention includes an arrangement for light control, which comprises, in combination, electrically energizable light source means for producing light pulses traveling along at least one predetermined path at a pulse frequency depending upon application of electric energizing pulses at such frequency to said light source means; electric circuit means for applying electric current impulses at said frequency to said light source means for energizing the latter; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; delay means cooperating with said impulse transformer means for causing delivery of said substantially shortened output current pulses with such a delay that substantially coincidence between the peak of each of said light pulses produced by said current impulses applied to said light source means and the peak of the corresponding delayed substantially shortened output current pulse is obtained; and Kerr cell means arranged in the path of said light pulses and connected with said secondary winding for being operated as a light valve at said pulse frequency by said delayed substantially shortened output current pulses, said Kerr cell means permitting accordingly passage of said light pulses therethrough with the duration of the individual light pulses being further reduced to a duration shorter than that of said substantially shortened output current pulses due to the characteristic of said Kerr cell means.

In another aspect of the invention it includes an arrangement for producing cinematographic pictures with extremely brief exposure times, which comprises, in combination, cinematographic camera means including a movable film and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; and electric circuit means for applying electric current impulses at said frequency to said light source means for energizing the latter and including first control means for causing said light pulses to occur individually within said predetermined consecutive time periods, respectively, and second control means for causing the original pulse duration of said light pulses to be reduced, before they reach said shutter means, to an effective pulse duration substantially shorter than that of said predetermined consecutive time periods of shutter action.

Figure 1B:
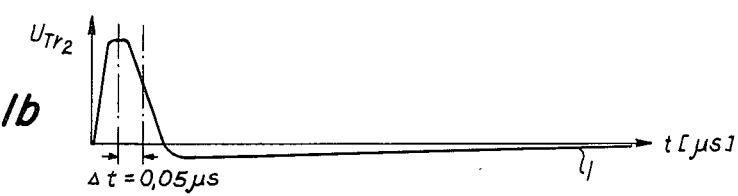
Figure 1C:
Figure 1D:
Figure 2:
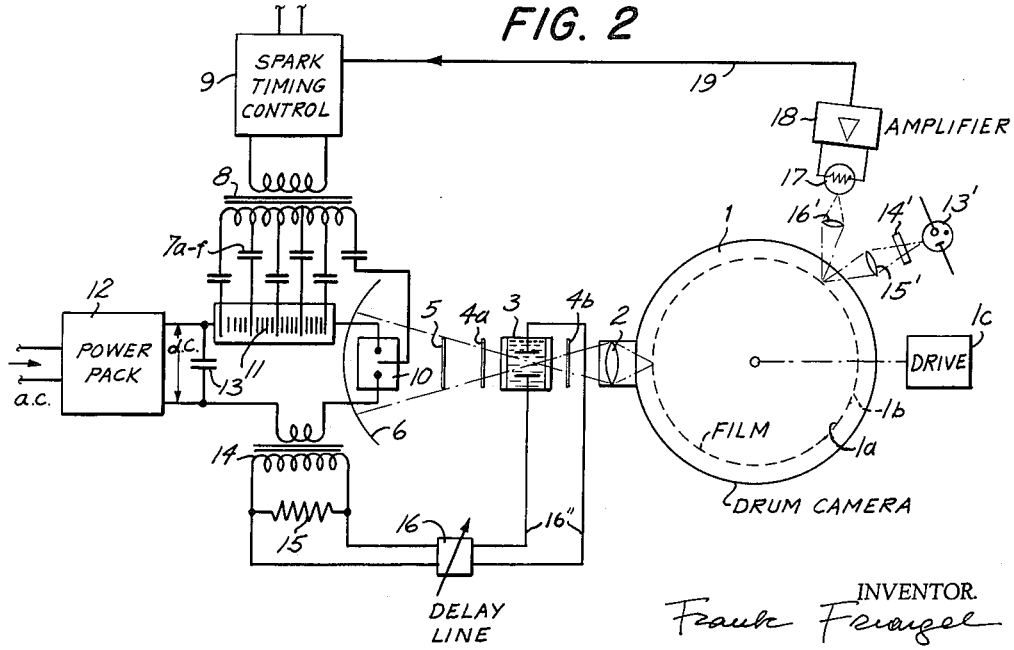

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIGS. 1a to 1d are diagrams illustrating the shape of light pulses and electric pulses as occurring in the operation of an arrangement according to the invention; and FIG. 2 is a schematic diagram of an embodiment of the invention.

In the arrangement according to FIG. 2 a power pack 12 is provided which is preferably a source of supply of high voltage alternating current energy and includes rectifier means for delivering the required amount of direct current energy for charging a capacitor 13. This capacitor 13 is dischargeable across a conventional spark gap device 10, the discharge circuit containing a conventional quenched spark gap device 11 for timing the discharges and thereby the sparks across the spark gap device 10, and the primary winding of an impulse generator 14.

The quenched spark gap device gap 11 is controlled in a conventional manner via igniting capacitors 7a–7f by an igniting transformer 8 which, in turn, is supplied by a conventional spark timing control device 9 at a predetermined frequency of e.g. 50,000 sparks per second to be produced across the quenched spark gap device 11 and the spark gap device 10. The timing control device 9 may comprise quartz crystal oscillator means for precisely maintaining the desired spark frequency, or it may be controlled from a different frequency determining source as will be described further below.

The spark gap device 10 may be provided with an igniting electrode controlled from the igniting transformer 8 via the igniting capacitor 7f. Preferably the spark gap device 10 is supplemented by a suitable reflector 6.

The impulse transformer 14 has a secondary winding for producing an output current pulse in response to every current pulse resulting from the discharge of the capacitor 13 and causing the emission of a light pulse from the spark gap device 10. The transformer 14 is so constructed, e.g. by the inclusion of differentiator or capacitive means, that the output current pulse constitutes the first derivative of the corresponding current impulse applied to the primary winding. A damping resistor 15 is connected across the output terminals of the transformer 14 in order to render the transformer fully effective as a transformer having a differentiating characteristic.

A Kerr cell 3 of conventional type is arranged across the path of the light pulses emanating from the spark gap device 10 and comprises a transparent housing filled with nitrobenzene within which a capacitor including at least two plates spaced from each other in direction transverse of the direction of the path of the light pulses are arranged and these plates are connected by conductors 16 with the output terminals of the impulse transformer 14. Preferably these conductors constitute a delay line as explained further below. In a conventional manner the Kerr cell 3 is supplemented by two polarizers 4a and 4b having polarization planes oriented at right angles to each other, one polarizer being located ahead of the Kerr cell and the other one being arranged behind the Kerr cell. An object 5 to be illuminated by the light pulses may be arranged, as shown, between the spark gap device 10 and the first polarized 4a.

The Kerr cell 3 is operated and functions, together with the polarizers 4a and 4b in the manner set forth further above.

It should be noted that an impulse transformer of the above mentioned characteristic produces, in spite of comparatively massive iron core members, output pulses being shaped with an extremely steep rise. Since conventional impulse transformers having a differentiating characteristic usually have a primary winding composed of only one to two turns it is well possible to connect such primary winding in series with spark generators of low inductivity e.g. with spark gap light sources controlled by a quenched spark gap device.

In operation, as illustrated by FIGS. 1a to 1d the current impulses $I_s$ passing through the primary winding of the transformer 14 upon discharge of the capacitor 13 have the shape illustrated by FIG. 1a if said primary is connected in series with a spark gap arrangement of low inductivity. As can be seen the current rises to the peak within a time of .1 $\mu$s. and decays during a period of about 1$\mu$s. The output voltage $U_{Tr2}$ of the secondary winding of the differentiating impulse transformer 14 corresponds to the first derivative of the pulse shape of FIG. 1a and is illustrated by FIG. 1b. As can be seen the output pulse has almost rectangular shape although with a less steep slope on the descending side as compared with the ascending side which is unavoidable in view of the decrease of the rising speed in the area of the peak of the curve of FIG. 1a. In any case, it can be seen that the output pulse has a substantially shorter duration than the current pulse according to FIG. 1a.

The output pulse from the transformer 14 appears at the terminals of the Kerr cell 3 as a voltage pulse $U_{Kz}$ as illustrated by FIG. 1c. However, it should be clear from the above that the peak of the current impulse $I_s$ which coincides with the peak of the thereby produced light pulse occurs at a moment which is somewhat later than the moment when the peak of the output pulse from the secondary winding of the transformer 14 occurs, the time difference being for instance .05 $\mu$s. as indicated in FIG. 1b. This is undesirable because for best results the Kerr cell arrangement should be in light passing condition at the same moment when the light pulse delivered by the spark gap device 10 has its peak.

However, the above-mentioned time difference can be compensated completely by providing delay line means between the output of the transformer 14 and the Kerr cell 3. In many cases it will be sufficient to use for the connections 16 a UHF antenna cable. As a result of the delay means mentioned above the voltage pulse according to FIG. 1c will be moved in time so as to substantially coincide with the peak of the current impulse according to FIG. 1, as shown in the drawing. Preferably a variable delay line device 16 is used.

The voltage pulse according to FIG. 1c causes the Kerr cell 3 to assume a condition in which the light pulse from the device 10 can pass through the Kerr cell. However, it is to be borne in mind that the opening and closing of a Kerr cell device follows a cos² law so that the shape of the light pulse passed by the Kerr cell arrangement 3, 4a and 4b has flanks which are substantially steeper than those of the pulse according to FIG. 1b. Consequently the light pulse passed through the Kerr cell arrangement will have a shape as illustrated by FIG. 1d and a duration of only about 50 nanoseconds.

It may be added here that for reasons partly set forth at the outset the spark gap device 10 is not controlled by a conventional device like a thyratron but by the quenched spark gap device 11 because this device is capable as is well known, of delivering in spite of its comparatively small overall dimensions those extremely steep current impulses of several thousand amperes which are to be applied to the impulse transformer 14. The capability of the arrangement according to the invention will be recognized from the following example: assuming that the capacity of the quenched spark gap device 10 is $50 \cdot 10^{-12}$ farad and the voltage to operate the Kerr cell is 30 kv., then the energy to be introduced into the Kerr cell capacitively for causing the latter to change from light-blocking to light-passing condition is $$E = \tfrac{1}{2}CU_2 = \tfrac{1}{2} \cdot 50 \cdot 10^{-12} \cdot 9 \cdot 10^2 \text{ joule}$$
$$= 225 \cdot 10^{-4} \text{ joule} = .0225 \text{ joule}$$

If now the Kerr cell is to be changed between blocking and passing condition within a time period of only $10^{-8}$ seconds then the power to be introduced into the Kerr cell during this brief period is $$N = \frac{E}{t} = \frac{.0225}{10^{-8}} \frac{\text{wattsec.}}{\text{sec.}} = 2.25 \cdot 10^6 \text{ watt}$$
$$= \text{appr. 2 megawatts}$$

However, since there are unavoidable losses in a megawatt discharge circuit amounting to about 50 percent so that the impulse generator would have to handle 4 megawatts. With an input voltage of e.g. 4,000 volts this would mean a current of 1,000 amps. Larger Kerr cells would of course call for power supplies up to 20 megawatts.

An impulse transformer of the type contemplated above has in addition the advantageous characteristic that the output voltage is reduced automatically to zero upon termination of the pulse. However, it is also possible to arrange in a well known manner a short circuit cable in parallel with the Kerr cell whereby the time during which the Kerr cell is in light-passing condition is limited. If such cable is e.g. of a length of 3 meters then the transit time of the electric pulse forward and back through the cable at one-half light velocity would amount to $4 \cdot 10^{-8}$ seconds. Such a cable may be considered as a short-circuited Lecher system. In this case after the application of an energizing pulse to the Kerr cell for changing it to light-passing condition the voltage at the Kerr cell would return to zero after a time period of $4 \cdot 10^{-8}$ seconds. Thus, without any other electronic means but only by properly dimensioning the length of the above mentioned short-circuit line very brief light-passing conditions of the Kerr cell can be obtained.

Since the quenched spark gap device 10, as described for instance in the U.S. Patent No. 2,703,374 can handle very high pulse frequencies in view of its rapid de-ionization, practically any desired impulse frequency e.g. up to 300,000 pulses per second can be handled with the arrangement according to the invention, the individual periods of light-passing condition of the Kerr cell arrangement being as brief as desired. Such operation was not possible with conventional equipment up to now.

In a further development the invention includes an arrangement for producing cinematographic pictures with extremely brief exposure time wherein for instance an arrangement as described above is combined with a high speed cinematographic camera, for instance a drum camera of known construction as diagrammatically illustrated in FIG. 2.

FIG. 2 shows a drum camera 1 of conventional type in which a film strip 1a is moved along a circular path under the action of suitable drive means or film transport means 1c. An optical system 2 of the camera is arranged in the path of the light pulses passed by the Kerr cell arrangement 3, 4a, 4b, so as to direct such light pulses toward the consecutive portions of the rotating film 1a. Of course, if desired, the Kerr cell arrangement could also be located between the optical system 2 and the film 1a. As is well known, the drum camera 1 would include some kind of a shutter which may be a rotating prism which renders the film accessible to incoming light through predetermined consecutive time periods.

For obvious reasons the application of the light pulses to the film must be synchronized with the shutter action. This can be done in various ways. If the drum carrying the film rotates at a constant speed with a corresponding frequency of shutter operation, then it may be sufficient to adjust the pulse frequency of the spark timing control 9 to a corresponding frequency and to make sure that this frequency remains also constant.

As an alternative, and if the film 1a is provided with conventional consecutive perforations 1b, then the spark timing control 9 may be controlled for the purpose of synchronization via line 19 by an electro-optical system sensing the above-mentioned film perforations 1b.

By way of example such an arrangement may comprise a source of light 13' e.g. a glow lamp, the light of which is projected through a lens system 15', preferably after passing through an infrared filter 14' onto that portion of the film strip 1a which contains the consecutive row of perforations 1b. This light is intermittently reflected through a second lens system 16' onto a preferably infrared sensitive photocell 17 the output whereof is applied to an amplifier 18. The resulting pulses which are bound to have a fixed proportion to the picture frequency of the camera are applied via line 19 to the timing control 9 so as to cause the spark discharges of the device 10 controlled thereby to occur in synchronism with the shutter action of the camera.

In operation, with the drum with the film in the drum camera 1 rotating, the spark gap device 10 will emit light pulses projecting images of the object 5 through the Kerr cell arrangement 3, 4a, 4b and lens system 2 onto consecutive portions of the moving film 1a. It is to be understood that the shutter of the camera 1 will render the film 1a accessible to the light pulses passed by the Kerr cell arrangement through predetermined consecutive time periods corresponding to the desired or available picture frequency. However, these predetermined time periods of the shutter action will be considerably longer than the light pulses passed through the Kerr cell arrangement. In other words, the light valve action of the Kerr cell arrangement is superimposed on the action of the conventional shutter of the camera. Consequently exposure times for the individual pictures are obtained which are considerably shorter than they would be if only the ordinary shutter action would be utilized. Consequently, extremely sharp pictures of rapidly changing or transient phenomena are thus obtained by means of the arrangement according to the invention.

For instance, a conventional high speed cinematographic camera has a picture frequency of 8,000 pictures per second. A rotary prism type shutter of such a camera renders the film accessible to incoming light through predetermined periods amounting to 25 μsec. It is evident that such an exposure time is much too long for photographing rapidly changing phenomena. However, by utilizing the arrangement as described above it is easily possible to adjust or construct the components in such a manner that the light-passing period of the Kerr cell arrangement is reduced to 1 μsec. or even to .1 μsec. or some other value. The resulting effective exposure time can be made as brief as desired provided that the intensity of the available light is sufficient to result in a sufficient exposure of the film material.

It can be seen that this arrangement results in the advantage that the effective exposure time per picture is independent of the picture frequency of the camera. The light source and control arrangement can be set or chosen to produce effective light pulses of a predetermined brief duration irrespective of whether the camera is operated at a picture frequency of say 1,000 or 8,000 pictures per second. The light-passing periods of the Kerr cell arrangement are determined by the control circuit and are therefore absolutely constant. Therefore the film exposure will remain constant even if the speed of the film transport and of the shutter action should vary between the start of operation and a later moment when the camera is operating at full speed. This is in strict contrast to ordinary high speed camera photography where the exposure times vary inversely proportionally with the picture frequency and are therefore not constant. As mentioned above the arrangement according to the invention can be used also in connection with light pulses within the ultraviolet spectrum in which case the Kerr cell container would have to be filled with $C_2H_5CN$ and would be associated with calc-spar prisms as polarizers while in the operation with visible light usually the Kerr cell is filled with nitrobenzene in cooperation with polarizing filters or Nicol prisms. When using a Kerr cell filled with the above-mentioned liquid when dealing with ultraviolet light it is to be taken into consideration that in this case the voltage to be applied to the Kerr cell must be about twice as high as in the case of using a Kerr cell filled with nitrobenzene so that the output voltage of the impulse transformer 14 must be adjusted or selected accordingly. On the other hand, the material of the lens system 2 may not be permeable for ultraviolet radiation. In such a case it is only necessary to insert between the Kerr cell arrangement and a camera a conventional image converter which is responsive to ultraviolet radiation and produces on a screen a picture which can be observed within the visible spectral range. Then this visible picture is photographed by the camera 1. Also in case the intensity of the light pulses passed by the Kerr cell arrangement is too low for producing satisfactory pictures, then a conventional image amplifier may be inserted in the same manner between the Kerr cell arrangement and the camera.

The arrangement as described above makes it possible to produce high speed cinematographic pictures of extremely brief duration both of objects which are opaque so that shadow-graphs are obtained and of objects which are themselves light-emitting. Consequently, also phenomena can be successfully photographed which are composed of dark phases and self-luminous phases for instance the behavior of fuse wires under increasing load. Before application of a critical load the picture of the wire will appear as a shadowgraph thereof, and when the critical load on the wire is exceeded even the burning portions of the wire will be correctly photographed. Because of the short light-passing time period of the Kerr cell light valve the self-luminous phase of the event is, despite the brilliance of the light emitted, relatively dark compared with the back lighting from the spark light source.

It is to be added that the entire arrangement is comparatively very simple. In particular, the impulse transformer 14 may consist of ordinary generator sheet laminations because upon energization of the transformer the increasing magnetic field spreads over the entire volume of the transformer disregarding the skin effect. Since during the rise of the current pulse no oscillation occurs it is not necessary to provide for the transformer a closed magnetic circuit. Thus for instance a transformer core made of generator sheet metal of .3 mm. thickness in open E-shape would be entirely satisfactory.

It will be understood that each of the elements described above or two or more together, may also find a useful application in other types of an arrangement for light control and particularly in connection with a cinematographic camera, differing from the types described above.

While the invention has been illustrated and described as embodied in an arrangement for light control and particularly in connection with a cinematographic camera, including the use of a Kerr cell arrangement as a light valve, it is not intended to be limited to the details shown, since various modifications and structural changes may be made without departing in any way from the spirit of the present invention as defined in the claims.

What is claimed and desired to be secured by Letters Patent is:

1. An arrangement for producing cinematographic pictures with extremely brief exposure times, comprising, in combination, cinematographic camera means including a movable film and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; and electric circuit means for applying electric current impulses at said frequency to said light source means for energizing the latter and including first control means for causing said light pulses to occur individually within said predetermined consecutive time periods, respectively, and second control means for causing the original pulse duration of said light pulses to be reduced, before they reach said shutter means, to an effective pulse duration substantially shorter than that of said predetermined consecutive time periods of shutter action.

2. An arrangement as claimed in claim 1, wherein image amplifier means sensitive to images applied thereto with comparatively low intensity and converting such images into images of increased intensity are interposed between said Kerr cell means and the cinematographic camera means.

3. An arrangement for producing cinematographic pictures with extremely brief exposure times, comprising, in combination, cinematographic camera means including a movable film provided with at least one row of consecutive perforations and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; and electric circuit means for applying electric current impulses at said frequency to said light source means for energizing the latter and including pulse timing means, synchronizing means for causing said light pulses to occur individually within said predetermined consecutive time periods, respectively, and control means for causing the original pulse duration of said light pulses to be reduced, before they reach said shutter means, to an effective pulse duration substantially shorter than that of said predetermined consecutive time periods of shutter action, said synchronizing means including electro-optical means for sensing said film perforations and for applying control pulses in rhythm with the sensing of said film perforations to said pulse timing means for controlling the latter.

4. An arrangement for producing cinematographic pictures with extremely brief exposure times, comprising, in combination, cinematographic camera means including a movable film and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; and electric circuit means for applying electric current impulses at said frequency to said light source means for energizing the latter; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; delay means cooperating with said impulse transformer means for causing delivery of said substantially shortened output current pulses with such a delay that substantially coincidence between the peak of each of said light pulses produced by said current impulses applied to said light source means and the peak of the corresponding delayed substantially shortened output current pulse is obtained; Kerr cell means arranged in the path of said light pulses and connected with said secondary winding for being operated as a light valve at said pulse frequency by said delayed substantially shortened output current pulses, said Kerr cell means permitting accordingly passage of said light pulses therethrough with the duration of the individual light pulses being further reduced to a duration shorter than that of said substantially shortened output current pulses due to the characteristic of said Kerr cell means; and control means for causing said light pulses to occur individually within said predetermined consecutive time periods of shutter action.

5. An arrangement for producing cinematographic pictures with extremely brief exposure times, comprising, in combination, cinematographic camera means including a movable film provided with at least one row of consecutive perforations and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; electric circuit means for applying electric current impulses at said frequency to said light source means for energizing the latter and including pulse timing means; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; delay means cooperating with said impulse transformer means for causing delivery of said substantially shortened output current pulses with such a delay that substantially coincidence between the peak of each of said light pulses produced by said current impulses applied to said light source means and the peak of the corresponding delayed substantially shortened output current pulse is obtained; Kerr cell means arranged in the path of said light pulses and connected with said secondary winding for being operated as a light valve at said pulse frequency by said delayed substantially shortened output current pulses, said Kerr cell means permitting accordingly passage of said light pulses therethrough with the duration of the individual light pulses being further reduced to a duration shorter than that of said substantially shortened output current pulses due to the characteristic of said Kerr cell means; and synchronizing means for causing said light pulses to occur individually within said predetermined consecutive time periods of shutter action, said synchronizing means including electro-optical means for sensing said film perforations and for applying control pulses in rhythm with the sensing of said film perforations to said pulse timing means for controlling the latter.

6. An arrangement for producing cinematographic pictures with extremely brief exposure times, comprising, in combination, cinematographic camera means including a movable film having at least one row of consecutive perforations and operable at a predetermined picture frequency and comprising shutter means causing consecutively the film to be accessible to incoming light through predetermined consecutive time periods, and film transport means for moving the film at a speed corresponding to said predetermined picture frequency; electrically energizable light source means for producing light pulses in direction toward said shutter means at a pulse frequency depending upon application of electric energizing pulses at such frequency to said light source means; electric circuit means for applying electric current impulses at said frequency to said light source means for energizing the latter and including pulse timing means; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; variable delay means cooperating with said impulse transformer means and adjustable for causing delivery of said substantially shortened output current pulses with such a delay that substantially coincidence between the peak of each of said light pulses produced by said current impulses applied to said light source means and the peak of the corresponding delayed substantially shortened output current pulse is obtained; Kerr cell means arranged in the path of said light pulses and connected with said secondary winding for being operated as a light valve at said pulse frequency by said delayed substantially shortened output current pulses, said Kerr cell means permitting accordingly passage of said light pulses therethrough with the duration of the individual light pulses being further reduced to a duration shorter than that of said substantially shortened output current pulses due to the characteristic of said Kerr cell means; and synchronizing means for causing said light pulses to occur individually within said predetermined consecutive time periods of shutter action, said synchronizing means including electro-optical means for sensing said film perforations and for applying control pulses in rhythm with the sensing of said film perforations to said pulse timing means for controlling the latter.

7. An arrangement for producing cinematographic pictures with extremely brief exposure times, comprising, in combination, cinematographic camera means including a movable film and operable at a predetermined picture frequency and comprising shutter means causing consecutively the film to be accesible to incoming light through predetermined consecutive time periods, and film transport means for moving the film at a speed corresponding to said predetermined picture frequency; electrically energizable spark light source means for producing spark light pulses in direction toward said shutter means at a pulse frequency depending upon application of electric energizing pulses at such frequency to said spark light source means; electric circuit means for applying electric current impulses at said frequency to said spark light source means for energizing the latter; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; delay means cooperating with said impulse transformer means for causing delivery of said substantially shortened output current pulses with such a delay that substantially coincidence between the peak of each of said light pulses produced by said current impulses applied to said spark light source means and the peak of the corresponding delayed substantially shortened output current pulse is obtained; Kerr cell means arranged in the path of said spark light pulses and connected with said secondary winding for being operated as a light valve at said pulse frequency by said delayed substantially shortened output current pulses, said Kerr cell means permitting accordingly passage of said light pulses therethrough with the duration of the individual spark light pulses being further reduced to a duration shorter than that of said substantially shortened output current pulses due to the characteristic of said Kerr cell means; and control means for causing said light pulses to occur individually within said predetermined consecutive time periods of shutter action.

8. An arrangement as claimed in claim 7, wherein said light source means includes a spark gap means and wherein said electric circuit means include a supply of high voltage energy, capacitor means chargeable by said high voltage energy and dischargeable across said primary winding of said impulse transformer means and said spark gap means, and timing means for controlling the discharge of said capacitor means and comprising quenched spark gap means connected between said capacitor means and said spark gap means and control means for timing the spark discharges across said quenched spark gap means.

9. An arrangement for producing cinematographic pictures with extremely brief exposure times, comprising, in combination, cinematographic camera means including a movable film and operable at a predetermined picture frequency and comprising shutter means causing consecutively the film to be accessible to incoming light through predetermined consecutive time periods, and film transport means for moving the film at a speed corresponding to said predetermined picture frequency; electrically energizable ultraviolet light source means for producing ultraviolet light pulses in direction toward said shutter means at a pulse frequency depending upon application of electric energizing pulses at such frequency to said ultraviolet light source means; impulse transformer means having a primary winding connected in said circuit means for being energized by said current impulses as they are applied to said light source means, and a secondary winding, said impulse transformer means being constructed for delivering output current pulses each of which constitutes the first derivative of the corresponding one of said current impulses so as to be substantially shortened relative to the latter; delay means cooperating with said impulse transformer means for causing delivery of said substantially shortened output current pulses with such a delay that substantially coincidence between the peak of each of said light pulses produced by said current impulses applied to said light source means and the peak of the corresponding delayed substantially shortened output current pulse is obtained; Kerr cell means including a transparent container filled with phenyl-thio-isocyanate and calc spar polarizers in front and behind said container, respectively, arranged in the path of said light pulses and connected with said secondary winding for being operated as a light valve at said pulse frequency by said delayed substantially shortened output current pulses, said Kerr cell means permitting accordingly passage of said ultraviolet light pulses therethrough with the duration of the individual light pulses being further reduced to a duration shorter than that of said substantially shortened output current pulses due to the characteristic of said Kerr cell means; and control means for causing said light pulses to occur individually within said predetermined consecutive time periods of shutter action.

10. An arrangement as claimed in claim 9, wherein image converter means sensitive to images applied thereto by ultraviolet radiation and converting such ultraviolet images into images appearing within the visible spectrum are interposed between said Kerr cell means and the cinematographic camera means.

References Cited by the Examiner

UNITED STATES PATENTS

| | | | |
|---|---|---|---|
| 2,186,013 | 1/40 | Edgerton | 352—200 |
| 2,427,969 | 9/47 | Lester | 352—84 |
| 2,464,279 | 3/49 | Zarem et al. | 320—1 |
| 2,478,907 | 8/49 | Edgerton | 315—188 |
| 2,927,215 | 3/60 | Allen et al. | 352—84 X |
| 3,044,068 | 7/62 | Hull et al. | 352—236 X |
| 3,116,660 | 1/64 | Goss et al. | 352—84 |

OTHER REFERENCES

Millimicrosecond Kerr Cell Camera Shutter article by A. M. Zarem et al., pp. 1041–1044 in The Review of Scientific Instruments, volume 29, No. 11, November 1958.

NORTON ANSHER, *Primary Examiner.*

WILLIAM MISIEK, *Examiner.*